(12) United States Patent
Oh et al.

(10) Patent No.: US 12,531,780 B2
(45) Date of Patent: Jan. 20, 2026

(54) NETWORK MANAGEMENT APPARATUS AND NETWORK MANAGEMENT METHOD

(71) Applicant: RAKUTEN MOBILE, INC., Tokyo (JP)

(72) Inventors: Jayoung Oh, Tokyo (JP); Masaaki Kosugi, Tokyo (JP); Jun Okada, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 406 days.

(21) Appl. No.: 17/767,123

(22) PCT Filed: Jun. 16, 2021

(86) PCT No.: PCT/JP2021/022932
§ 371 (c)(1),
(2) Date: Apr. 7, 2022

(87) PCT Pub. No.: WO2022/264339
PCT Pub. Date: Dec. 22, 2022

(65) Prior Publication Data
US 2024/0106703 A1  Mar. 28, 2024

(51) Int. Cl.
*H04L 41/0806* (2022.01)
*H04L 41/084* (2022.01)
*H04L 41/0866* (2022.01)

(52) U.S. Cl.
CPC ...... *H04L 41/0806* (2013.01); *H04L 41/0843* (2013.01); *H04L 41/0866* (2013.01)

(58) Field of Classification Search
None
See application file for complete search history.

(56) References Cited

U.S. PATENT DOCUMENTS 11,665,063 B1\* 5/2023 Luthra ................. H04L 41/024
    709/220
2003/0140128 A1\* 7/2003 Cox .................... H04L 41/0873
    717/171

(Continued)

FOREIGN PATENT DOCUMENTS

WO  2016/121802 A1  8/2016

*Primary Examiner* — Scott B Christensen
(74) *Attorney, Agent, or Firm* — Sughrue Mion, PLLC

(57) ABSTRACT

Disclosed herein is a network management apparatus, comprising: a basic information acquisition unit configured to acquire basic server information including server information and location information, the server information including identification information of an accommodating station accommodating a server that constitutes a network and an identifier of a BMC of the server, the location information indicating an installation location of the server in the accommodating station; a related information generation unit configured to generate server-related information including at least an IP address of the server based on the basic server information; a setting information generation unit configured to generate setting information necessary for provisioning the server based on the basic server information and the server-related information; and a data query unit configured to query the server about normality of the setting information generated by the setting information generation unit.

13 Claims, 11 Drawing Sheets

(56) References Cited

U.S. PATENT DOCUMENTS

| | | | |
|---|---|---|---|
| 2008/0281947 A1* | 11/2008 | Kumar | H04L 41/0806 709/220 |
| 2014/0122674 A1* | 5/2014 | Gray | H04L 41/0846 709/222 |
| 2014/0281614 A1* | 9/2014 | Mick | H04L 67/303 713/320 |
| 2015/0012623 A1* | 1/2015 | Jubran | H04L 41/0866 709/224 |
| 2016/0072761 A1* | 3/2016 | Shih | H04L 61/35 709/220 |
| 2017/0336841 A1* | 11/2017 | Ragupathi | G06F 1/26 |
| 2018/0024852 A1 | 1/2018 | Yabushita et al. | |
| 2018/0157532 A1* | 6/2018 | Kumar | G06F 9/5061 |
| 2022/0147335 A1* | 5/2022 | Juang | H04L 67/34 |

* cited by examiner

FIG. 6

| No | PARAMETER INFORMATION | |
|---|---|---|
| 1 | GC ID | ~ 401 |
| 2 | GC CODE | |
| 3 | GC NAME(JP) | |
| 4 | GC NAME(EN) | |
| 5 | GC TYPE | |
| 6 | REGIONAL INFORMATION | |
| 7 | IP ADDRESS INFORMATION | |
| 8 | DESTINATION CDC INFORMATION | |
| 9 | RACK INFORMATION | |
| 10 | SERVER INFORMATION | |

FIG. 8

| No | PARAMETER INFORMATION | ~402 |
|---|---|---|
| 1 | GC CODE | |
| 2 | GC TYPE | |
| 3 | SERVER ID | |
| 4 | SERVER CODE | |
| 5 | HOSTNAME | |
| 6 | SERIAL NUMBER | |
| 7 | MAC ADDRESS | |
| 8 | RACK NAME | |
| 9 | RACK NUMBER | |

FIG. 11

| No | PARAMETER INFORMATION | ~403 |
|---|---|---|
| 1 | SERVER ID | |
| 2 | MAC ADDRESS | |
| 3 | BMC IP | |
| 4 | SERIAL NUMBER | |
| 5 | POWER STATUS | |
| 6 | DISK INFORMATION | |
| 7 | MEMORY INFORMATION | |
| 8 | FIRMWARE VERSION | |
| 9 | FAULT LED CHECK | |

NETWORK MANAGEMENT APPARATUS AND NETWORK MANAGEMENT METHOD

CROSS REFERENCE TO RELATED APPLICATIONS

This application is a National Stage of International Application No. PCT/JP2021/022932, filed Jun. 16, 2021.

TECHNICAL FIELD

The present invention relates to a network management apparatus, a network management method, and a program thereof, and in particular to a technique for provisioning devices constituting a mobile network.

BACKGROUND ART

With a background of improved performance of general-purpose servers and network infrastructures, cloud computing (hereinafter simply referred to as "cloud"), which on demand uses computing resources that are virtualized on physical resources such as servers, has become widely prevailing. In addition, the Network Function Virtualization (NFV), which virtualizes network functions and provides the virtualized network functions on the cloud, has been well known. The NFV is a technology that uses virtualization and cloud technologies to separate the hardware and software of various network services, which used to run on dedicated hardware, and to run the software on a virtualized infrastructure. It is expected to improve the sophistication of operations and reduce costs by use of those virtualization technologies.

In recent years, the virtualization has been advanced in mobile networks as well.

The European Telecommunications Standards Institute (ETSI) NFV defines the NFV architecture (see, for example, Patent Literature 1).

LISTING OF REFERENCES

Patent Literature

PATENT LITERATURE 1: International Publication of PCT International Patent Application No. WO2016/121802 A

SUMMARY OF THE INVENTION

Problems to be Solved by the Invention

Recent mobile networks have been constructed on a virtualization infrastructure, thus have higher flexibility and scalability.

However, when newly constructing a data center (i.e., accommodating station) that accommodates, for example, servers, it is required that the server laying work or server installation work is manually conducted by an operator at the data center concerned. In addition, in order to provision the servers (in other words, initial settings), it is required to register in advance inventory data, which is setting information necessary for the provisioning, such as hardware information of the servers. Nevertheless, conventionally the registration of the inventory data has been conducted manually.

Mobile networks are large-scale networks and include a large number of servers to be provisioned. For this reason, manually registering inventory data is a considerably time-consuming task. In addition, a human error inevitably occurs in the above mentioned human-intervening process, which is likely to lead to network failures.

The present invention has been made in order to solve the above mentioned problems and an object thereof is to provide a network management apparatus, a network management method, and a program thereof capable of registering setting information necessary for provisioning devices that constitute a large-scale network more easily with higher accuracy.

Solution to Problems

In order to solve the above mentioned problems, according to one aspect of the present invention, there is provided a network management apparatus, comprising: a basic information acquisition unit configured to acquire basic server information including server information and location information, the server information including identification information of an accommodating station accommodating a server that constitutes a network and an identifier of a BMC (Baseboard Management Controller) of the server, the location information indicating an installation location of the server in the accommodating station; a related information generation unit configured to generate server-related information including at least an IP address of the server based on the basic server information acquired by the basic information acquisition unit; a setting information generation unit configured to generate setting information necessary for provisioning the server based on the basic server information acquired by the basic information acquisition unit and the server-related information generated by the related information generation unit; and a data query unit configured to query the server about normality of the setting information generated by the setting information generation unit.

The identifier of the BMC may be a MAC address of the BMC.

The basic information acquisition unit may acquire the server information that is read from an image code assigned to the server by an operator who has installed the server in the accommodating station.

The server information may include the identifier of the BMC, and at least one of a server ID, a server code, a host name, and a serial number.

The basic information acquisition unit may acquire the location information specified by an operator who has installed the server in the accommodating station.

The location information may include at least one of a rack name and a rack number of a rack in which the server is installed.

The network management apparatus may further comprise: a template generation unit configured to generate a template of the setting information for each of the accommodating stations; and wherein the setting information generation unit may generate the setting information by embedding the basic server information acquired by the basic information acquisition unit and the server-related information generated by the related information generation unit into the template generated by the template generation unit based on the identification information of the accommodating station acquired by the basic information acquisition unit.

The identifier of the BMC may be a MAC address of the BMC, and the data query unit may query for the MAC address of the server to be queried, and, when the queried MAC address coincides with the MAC address corresponding to the server to be queried included in the setting information generated by the setting information generation unit, may determine the setting information to be normal.

The data query unit may query for server specifications of the server to be queried, and, when the queried server specifications coincide with a desired server specifications depending on the identification information of the accommodating station and the location information that correspond to the server to be queried included in the setting information generated by the setting information generation unit, may determine the setting information to be normal.

The network management apparatus may further comprise: a provisioning execution unit configured to execute provisioning of the server using the setting information generated by the setting information generation unit when the normality of the setting information is confirmed by the data query unit.

The basic information acquisition unit may acquire the basic server information of the server on which a virtual machine operates.

According to another aspect of the present invention, there is provided a network management method performed by a network management apparatus, comprising steps of: acquiring basic server information including server information and location information, the server information including identification information of an accommodating station accommodating a server that constitutes a network and an identifier of a BMC (Baseboard Management Controller) of the server, the location information indicating an installation location of the server in the accommodating station; generating server-related information including at least an IP address of the server based on the basic server information; generating setting information necessary for provisioning the server based on the basic server information and the server-related information; and querying the server about normality of the setting information.

According to yet another aspect of the present invention, there is provided a network management program for causing a computer to execute network management processing, the program causing the computer to execute processing comprising: a basic information acquisition process for acquiring basic server information including server information and location information, the server information including identification information of an accommodating station accommodating a server that constitutes a network and an identifier of a BMC (Baseboard Management Controller) of the server, the location information indicating an installation location of the server in the accommodating station; a related information generation process for generating server-related information including at least an IP address of the server based on the basic server information acquired by the basic information acquisition process; a setting information generation process for generating setting information necessary for provisioning the server based on the basic server information acquired by the basic information acquisition process and the server-related information generated by the related information generation process; and a data query process for querying the server about normality of the setting information generated by the setting information generation process.

Advantageous Effect of the Invention

According to the present invention, it makes it possible to register setting information necessary for provisioning devices that constitute a large-scale network more easily with higher accuracy.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

FIG. 6 is a schematic diagram illustrating an exemplary description of the template.

FIG. 8 is a schematic diagram illustrating an exemplary description of the inventory information.

FIG. 11 is a schematic diagram illustrating an exemplary description of data for querying for the inventory data.

DESCRIPTION OF EMBODIMENTS

Figure 1:
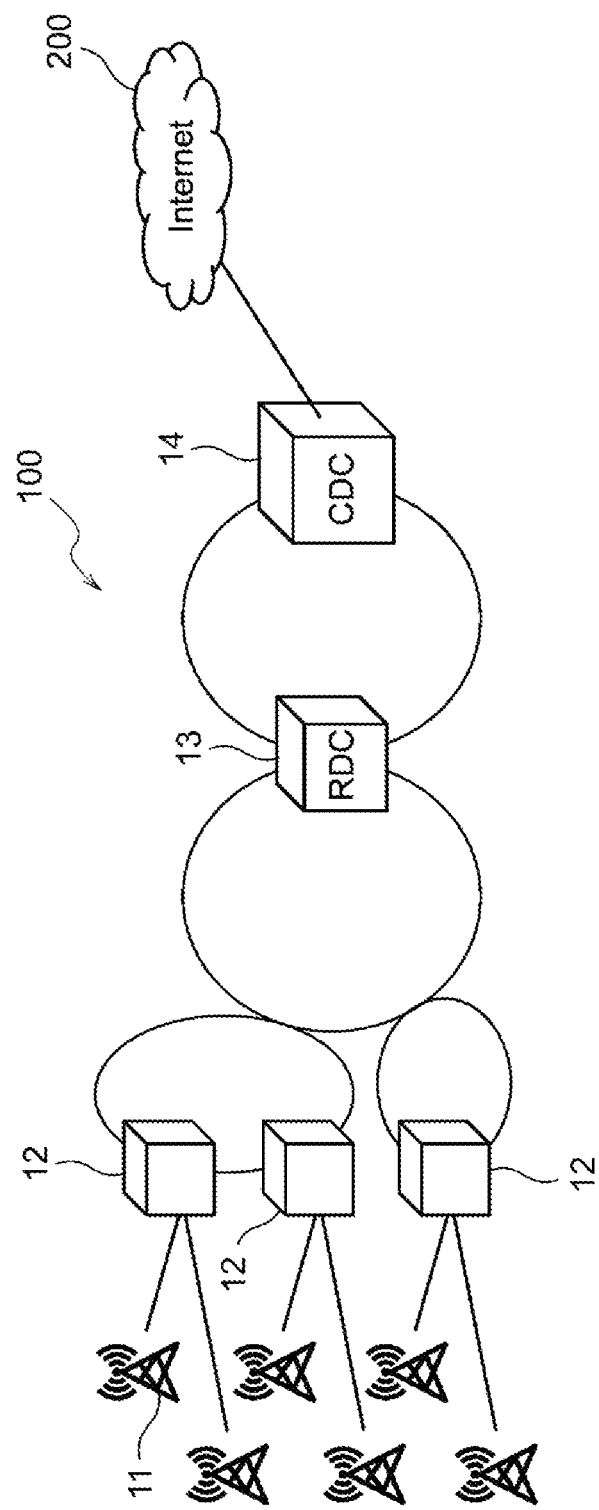
FIG. 1 is a conceptual diagram illustrating an exemplary network configuration of a mobile network including a network management apparatus according to the present embodiment of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which a network management apparatus according to the present embodiment has an inventory management function that generates inventory data for the devices (e.g., servers) constituting a virtualization infrastructure in a mobile network constructed on the virtualization infrastructure, and confirms and manages the normality (or correctness) of the generated inventory data.

The inventory data is setting information required for the provisioning (i.e., initial setting or configuration) of the servers, and includes basic server information such as identification information of an accommodating station that accommodates the server, server information including the hardware information of the server, and location information indicating the installation location of the server in the accommodating station. The provisioning of the servers includes the installation of software including the operating system and applications.

FIG. 1 is a conceptual diagram illustrating an exemplary network configuration of a mobile network 100 including a network management apparatus according to the present embodiment.

In the mobile network 100 shown in FIG. 1, a mobile communicable terminal such as a smartphone and the Radio Access Network (RAN) communicate with each other wirelessly, and the transmitted information is relayed through the backhaul network (i.e., Mobile Backhaul: MBH) to the core network for processing. This allows the mobile communicable terminal to connect to the Internet 200 or connect to another company's network to make voice calls, or the like.

More particularly, the mobile network 100 includes base stations 11 and a plurality of accommodating stations 12 to 14. In FIG. 1, the accommodating station 12 is an edge data center, the accommodating station 13 is a Regional Data Center (RDC), and the accommodating station 14 is a Central Data Center (CDC). A backhaul network is constituted between the edge data center 12 and the central data center 14.

The mobile network 100 according to the present embodiment may be a virtualized network constructed on a virtualization infrastructure. The mobile network 100 realizes everything from the switching equipment of the backbone network to the radio access functions of the base stations by software on general-purpose servers.

The base station 11 is equipped with an antenna, a switchboard, a battery, and the like. The edge data center 12 is located near the base stations 11 and is connected to a plurality of base stations 11 via fiber-optic cables, or the like. The edge data center 12 realizes the RAN-related radio access functions.

The regional data center 13 is connected to a plurality of edge data centers 12. The regional data center 13 realizes, by software, the firewall/NAT (Network Address Translation), the CDN (Content Distribution Network), and various applications for edge computing.

The central data center 14 is connected to a plurality of regional data centers 13. The central data center 14 realizes core functions such as the EPC (Evolved Packet Core), the IMS (IP Multimedia Subsystem), or the like.

It should be noted that the number of respective data centers (i.e., accommodating stations), that is, the edge data center 12, the regional data center 13, and the central data center 14, is not limited to the number shown in FIG. 1. For example, although only one regional data center 13 and one central data center 14 are shown in FIG. 1, there may be a plurality of regional data centers 13 and central data centers 14, respectively.

Figure 2:
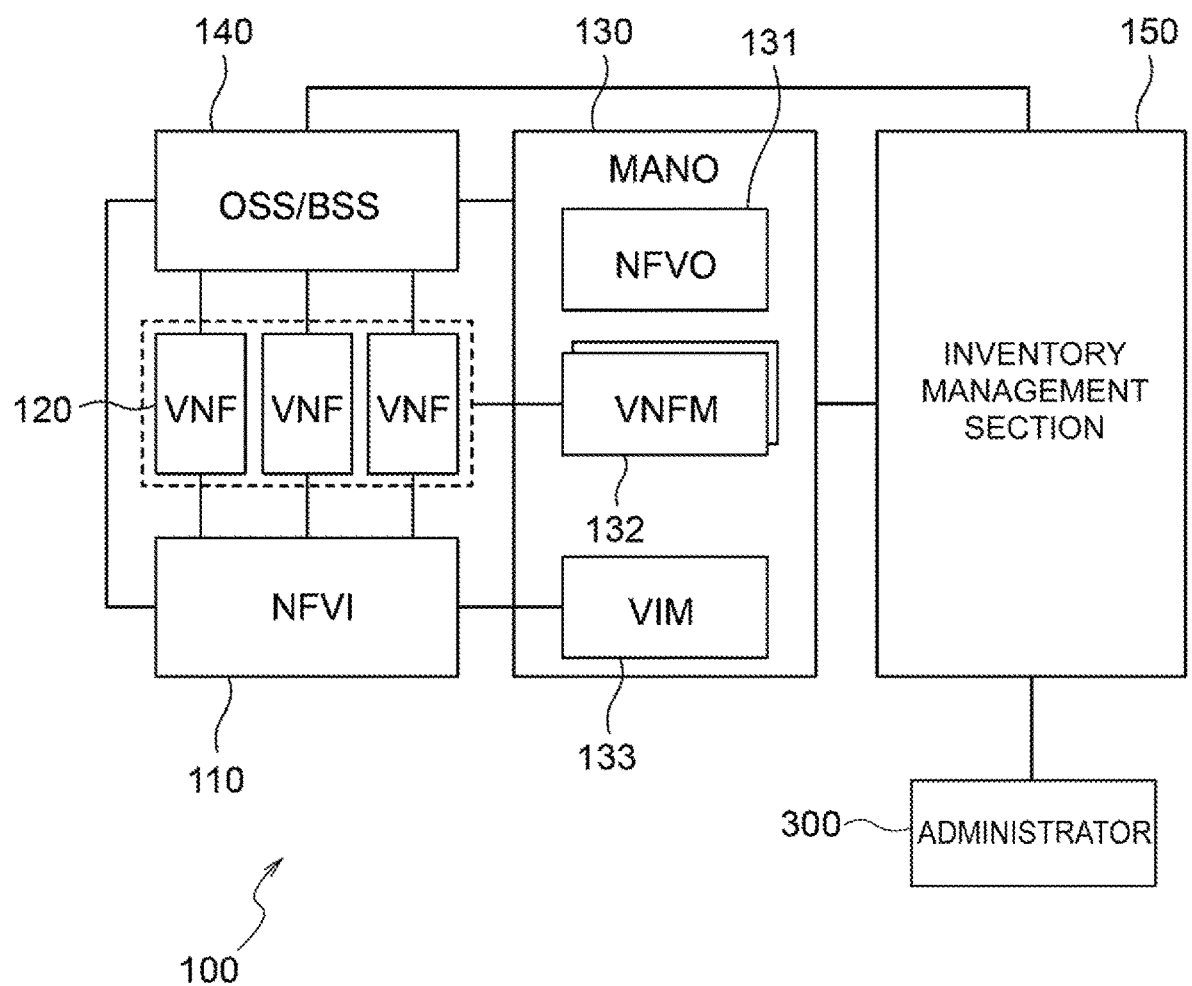
FIG. 2 is a block diagram illustrating an exemplary internal configuration of a network management system.

FIG. 2 is a block diagram illustrating an exemplary internal configuration of a network management system that constitutes the mobile network 100.

Each of constituent elements shown in FIG. 2 has a reference point. The lines connecting the constituent components shown in FIG. 2 indicate that connected constituent elements via the line can send and receive information from each other.

The NFVI (NFV Infrastructure) 110 is a network function virtualization infrastructure, and includes physical resources, a virtualization layer, and virtualized resources. The physical resources include hardware resources such as computing resources, storage resources, and transmission resources. The virtualization layer is a virtualizing layer such as a hypervisor for virtualizing the physical resources and providing the virtualized physical resources to the VNF (Network Function Virtualization) 120. The virtualized resources are the virtualized infrastructure resources provided to the VNF 120.

In other words, the NFVI 110 is an infrastructure that enables flexible handling of hardware resources of physical servers (hereinafter also simply referred to as "servers"), such as computing, storage, and network functions, as virtualized hardware resources such as virtualized computing, virtualized storage, and virtualized network, which are virtualized by the virtualization layer such as the hypervisor.

A plurality of servers that constitute the NFVI 110 are grouped together and deployed in each of the data centers 12 to 14. The number, the placement positions, wiring, and the like, of the servers to be deployed in each of the data centers 12 to 14 are predetermined depending on the type of data center (i.e., accommodating station type). In each of the data centers 12 to 14, the deployed servers are connected by an internal network and are capable of sending and receiving information from each other. In addition, the data centers are connected to each other by a network, and the servers in different data centers are capable of sending and receiving information from each other via the network.

The VNF 120 corresponds to applications running on virtual machines (VMs) on the servers and implements the network functions by software. Although not specifically shown, each VNF 120 may be provided with a management function called an EM (Element Manager).

The NFVI 110 and the VNF 120 in FIG. 2 constitute the virtualized environment. In other words, the virtualized environment is constituted with three layers, in order from the lower layer: the hardware, the virtualization layer, and virtual machines.

The MANO (Management and Orchestration) 130 has management and orchestration functions for the virtualized environment. The MANO 130 includes the NFVO (NFV-Orchestrator) 131, the VNFM (VNF-Manager) 132, and the VIM (Virtualized Infrastructure Manager) 133.

The NFVO 131 orchestrates the NFVI resources, manages the lifecycle of network services, and provides integrated operational management of the entire system. The NFVO 131 is capable of performing processing in response to instructions from the OSS/BSS (Operation Support System/Business Support System) 140, which will be described below.

The VNFM 132 manages the lifecycle of each of the VNFs 120. It should be noted that the VNFM 132 may be arranged in the MANO 130 as a dedicated VNFM corresponding to each of VNFs 120. Alternatively, a single VNFM 132 may manage the lifecycle of two or more VNFs 120. In this case, the VNFM 132 may be a general-purpose VNFM that supports VNFs 120 provided by different vendors.

The VIM 133 performs operational management of the resources of the VNFs 120.

The OSS/BSS 140 is an integrated management system for the mobile network 100.

Here, the OSS is a system (i.e., equipment, software, mechanism, and the like) necessary for constructing and operating the desired services, and the BSS is an information system (i.e., equipment, software, mechanism, and the like) used for billing, invoicing, and customer services.

An inventory management section 150 realizes the inventory management function that generates inventory data and confirms or verifies the normality of the generated inventory data. For example, the inventory management section 150 may generate the inventory data in response to the instructions issued by an administrator 300, who manages the inventory data of each of devices constituting the network. The inventory management section 150 serves as the network management apparatus according to the present embodiment.

It should be noted that the inventory management section 150 is not limited to the case in which the inventory management section 150 is an external function of the OSS/BSS 140 or the MANO 130, as shown in FIG. 2. The inventory management section 150 may be provided inside the OSS/BSS 140 or the MANO 130. In this case, the inventory management function of the inventory management section 150 become a part of the functions of the OSS/BSS 140 or the MANO 130.

Figure 3:
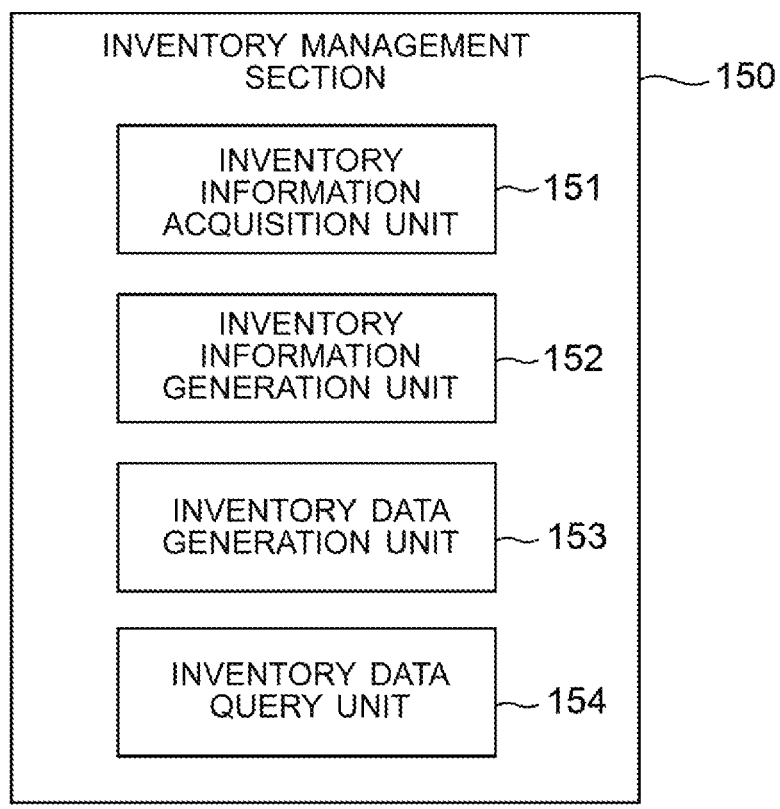
FIG. 3 is a block diagram illustrating an exemplary functional configuration of an inventory management section according to the present embodiment.

FIG. 3 is a block diagram illustrating an exemplary functional configuration of the inventory management section 150.

As shown in FIG. 3, the inventory management section 150 includes an inventory information acquisition unit 151, an inventory information generation unit 152, an inventory data generation unit 153, and an inventory data query unit 154.

The inventory information acquisition section 151 serves as a basic information acquisition unit that acquires basic server information as inventory information, which is information necessary for generating the inventory data. According to the present embodiment, the inventory information acquisition unit 151 acquires the inventory information transmitted from an operation terminal operated by an operator who has conducted the physical installation at the site (i.e., the accommodating station). The inventory information (i.e., basic server information) acquired by the inventory information acquisition unit 151 includes identification information of the accommodating station, server information including a MAC address, which is the identifier of the BMC (Baseboard Management Controller) of the server, and location information of the server in the accommodating station.

The inventory information generation unit 152 serves as a related information generation unit that generates server-related information, which is other inventory information necessary for generating the inventory data, based on the basic server information acquired by the inventory information acquisition unit 151. The inventory information generation unit 152 generates IP addresses at least from the MAC addresses of the BMCs acquired as the basic server information.

The inventory data generation unit 153 serves as a setting information generation unit that generates the inventory data, which is the setting information required for provisioning the servers. The inventory data generation unit 153 generates the inventory data based on the basic server information acquired by the inventory information acquisition unit 151 and the server-related information including the IP address generated by the inventory information generation unit 152.

The inventory data query unit 154 serves as a data query unit that queries the servers about the normality (or correctness) of the inventory data generated by the inventory data generation unit 153.

More particularly, the inventory data query unit 154 make a query for the MAC address of the server to be queried. Subsequently, when the queried MAC address coincides with the MAC address corresponding to the server to be queried, which is included in the inventory data generated by the inventory data generation unit 153, the inventory data query unit 154 determines that the inventory data is normal.

Also, the inventory data query unit 154 make a query for the server specifications of the server to be queried. Subsequently, when the queried server specifications coincide with the desired server specifications according to the identification information and the location information of the accommodating station corresponding to the server to be queried, which is included in the inventory data generated by the inventory data generation unit 153, the inventory data query unit 154 determines that the inventory data is normal.

Hereinafter, the inventory data management function according to the present embodiment will be described in detail.

According to the present embodiment, a certain case will be described in which the inventory data is generated by using a template for the inventory data for each of the accommodating stations (i.e., inventory template) and embedding the inventory information in the template.

In the following description, a certain example will be described in which the inventory data necessary for provisioning the servers accommodated in the edge data center 12 is generated. It should be noted that, hereinafter, the edge data center is referred to as a GC (Group unit Center) to distinguish the edge data center from other data centers.

Figure 4:
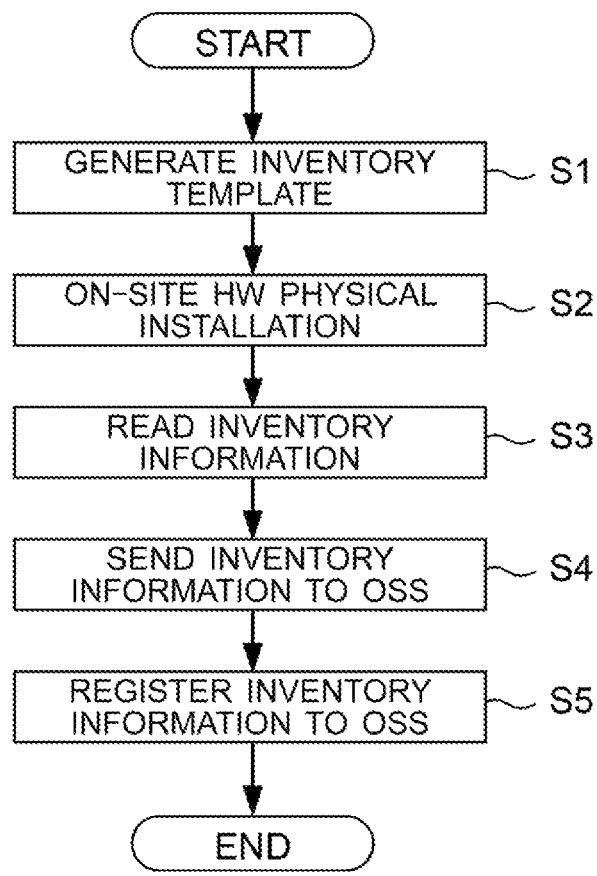
FIG. 4 is a flowchart illustrating an exemplary processing procedure of registration processing of the inventory information.

FIG. 4 is a flowchart illustrating an exemplary processing procedure of the registration processing of the inventory information, which is the information used to generate the inventory data.

First, in step S1, OSS 140 generates a template for each GC (i.e., inventory template) in response to a template generation request issued from the operator. The template generation request includes information indicating the GC type specified by the operator. The operator who issues the template generation request may be an on-site operator who actually conducts the physical installation of the hardware at the site (i.e., GC), or alternatively, an administrator 300 who manages the inventory data of each of devices constituting the network.

Figure 5:
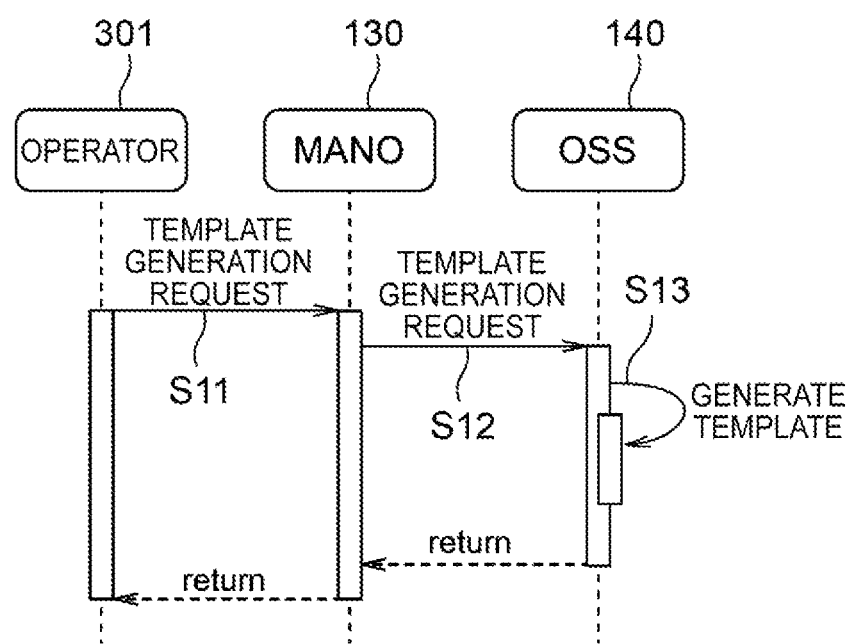
FIG. 5 is a sequence chart illustrating an exemplary operation of template generation.

FIG. 5 is a sequence chart illustrating an exemplary operation of the template generation.

First, in step S11, the operator 301 sends a template generation request to the MANO 130 with the GC type as the key. For example, the operator 301 may send the template generation request using a higher-level device of the MANO 130.

In step S12, the MANO 130 receives the template generation request from the operator 301 and requests the OSS 140 to generate the template.

Subsequently, in step S13, the OSS 140 generates the template. FIG. 6 illustrates an example of the template generated at this time.

To the "GC Type" of the 5$^{th}$ column in the template 401, the GC type specified by the operator 301 as the key for generating the template is input. The parameter information other than the 5$^{th}$ column is left blank at this point.

Subsequent to the generation of the template 401, the OSS 140 sends a return signal indicating the completion of template generation, as shown in FIG. 5. The return signal is sent back via the MANO 130 to the terminal (device) used by the operator 301.

It should be noted that, although the case in which the OSS 140 generates the templates has been described above, the inventory management section 150 may generate the templates upon receipt of the template generation request.

Referring back to FIG. 4, in step S2, the on-site operator conducts the physical installation of the hardware (HW). At this time, the on-site operator installs a plurality of servers in racks with the number, placement, and wiring depending on the GC type.

In step S3, the on-site operator reads the inventory information from the server. According to the present embodiment, the on-site operator scans the image code assigned to the server and reads the inventory information embedded in the image code.

The server information, which is a part of the basic server information, may be embedded in the above image code as the inventory information. The server information is information that uniquely identifies the server, and includes server identification information (i.e., server ID), a server code, a host name, a serial number, and a MAC address.

In step S4, the on-site operator sends the inventory information to the OSS 140 using the operation terminal. At this time, the on-site operator sends, as the inventory information, the basic server information, in which the server information read from the image code is tied to the GC identification information (i.e., identification information of the accommodating station) and the server location information, to the OSS 140. Here, the GC identification information includes the GC code (i.e., GC-specific management code) and the GC type. The server location information includes the rack name and the rack number of the rack in which the server is installed.

In step S5, the OSS 140 registers the inventory information received from the operation terminal into the management database, or the like.

Figure 7:
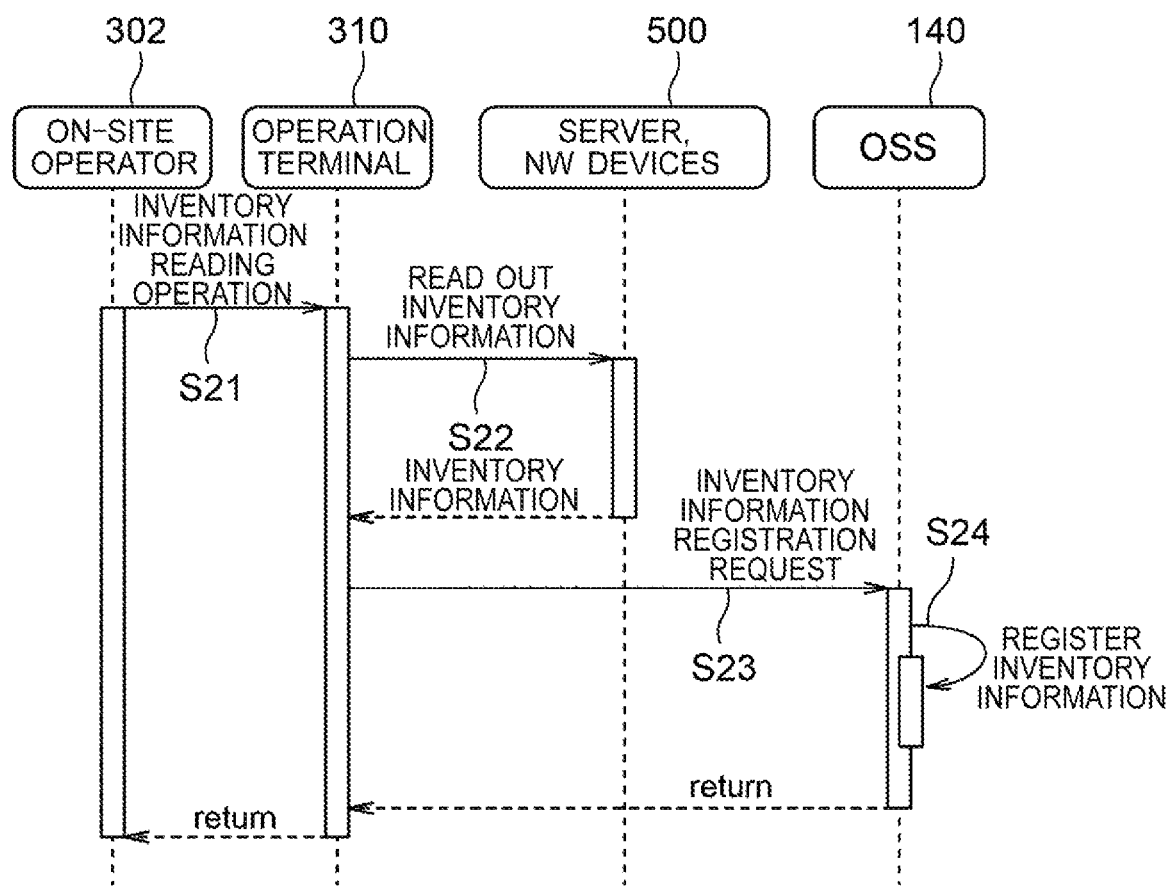
FIG. 7 is a sequence chart illustrating an exemplary operation of inventory information registration.

FIG. 7 is a sequence diagram illustrating an exemplary operation of registering the inventory information to the OSS 140.

In step S21, the on-site operator 302 reads the inventory information using the operation terminal 310 at the GC (i.e., edge data center) where the on-site operator conducts the physical installation of the server.

At this time, the on-site operator 302 specifies the identification information of the GC (e.g., GC code and/or GC type) accommodating the server concerned and the location information (e.g., rack name and/or rack number) of the server at the operation terminal 310, and then reads the inventory information.

According to the present embodiment, as described above, the on-site operator 302 reads the inventory information (i.e., server information) by scanning the image code assigned to the server concerned. Here, the above image code may be, for example, a QR code (registered trademark). The on-site operator 302 scans the QR code using the operation terminal 310.

It should be noted that the above image code is not limited to a two-dimensional code and may be any code that may be embedded with the server information. For example, the above image code may be a one-dimensional code such as a barcode or a customer barcode. Also, the above image code may be a multi-color code, such as a chameleon code (registered trademark).

By the inventory information reading operation by the on-site operator 302, in step S22, the operation terminal 310 reads the inventory information (i.e., server information) from the network devices (NW devices) and the server 500, respectively.

Subsequently, in step S23, the operation terminal 310 sends a request for inventory information registration to the OSS 140. At this time, the operation terminal 310 includes, as the inventory information, the basic server information, in which the server information read from the QR code of the server 500 is tied to the GC identification information and the server location information specified by the on-site operator 302, into the inventory information registration request, and forwards the inventory information registration request to the OSS 140.

The above described is a certain example in which the on-site operator 302 operates the operation terminal 310 at the GC and sends the request for inventory information registration to the OSS 140. However, it is sufficient for the on-site operator 302 to read the server information from the QR code at least at the GC where the physical installation is actually conducted. The work of transmitting the inventory information registration request including the server information read from the QR code from the operation terminal 31 to the OSS 140 may be performed at any location other than the GC as long as the environment allows data transmission to the OSS 140.

Furthermore, although the above described example is a certain case in which the inventory information registration request is sent from the operation terminal 310 to OSS 140, it is also possible to send the inventory information registration request from the operation terminal 310 to the OSS 140 via the inventory management section 150.

Yet furthermore, although the above described example is a certain case in which the inventory information is registered in the OSS 140, the operation terminal 310 may send the inventory information registration request to the inventory management section 150 to register the inventory information in the inventory management section 150. In this case, the inventory information acquisition unit 151 of the inventory management section 150 acquires the inventory information included in the inventory information registration request.

FIG. 8 is a schematic diagram illustrating an exemplary description of the inventory information (i.e., basic server information) included in the inventory information registration request sent from the operation terminal 310.

As shown in FIG. 8, the basic server information 402 includes the GC identification information ($1^{st}$ and $2^{nd}$ columns), the server information ($3^{rd}$ to $7^{th}$ columns), and the server location information ($8^{th}$ and $9^{th}$ columns). Here, the GC identification information ($1^{st}$ and $2^{nd}$ columns) and the server location information ($8^{th}$ and $9^{th}$ columns) are information specified by the on-site operator 302, and the server information ($3^{rd}$ to $7^{th}$ columns) is information read from the QR code.

Referring back to FIG. 7, in step S24, the OSS 140 registers, as the inventory information, the basic server information 402 included in the inventory information registration request sent from the operation terminal 310.

More particularly, the OSS 140 fills in the template 401 shown in FIG. 6 based on the basic server information 402 shown in FIG. 8, and registers, as the inventory information, the filled template 401 in the management database, or the like, managed by the OSS 140.

At this time, the OSS 140 reads the template 401 corresponding to the GC type ("GC Type" of $2^{nd}$ column) included in the basic server information 402 and fills in the "GC ID" of $1^{st}$ column in the template 401 with the administrative ID of the GC. The GC ID is generated by the OSS 140. In addition, the OSS 140 fills in the "GC Code" of $2^{nd}$ column in the template 401 with the "GC Code" of $1^{st}$ column in the basic server information 402.

$3^{rd}$ $4^{th}$, and $6^{th}$ to $8^{th}$ columns in the template 401 are filled with information tied to "GC Code" in advance, respectively.

For example, the correspondence information (e.g., table) that correlates the parameter information of $3^{rd}$, $4^{th}$, and $6^{th}$ to $8^{th}$ columns in the template 401 to the "GC Code" may be prepared in advance, and the OSS 140 may refer to the correspondence information based on the "GC Code" to fill in the parameter information of $3^{rd}$, $4^{th}$ and $6^{th}$ to $8^{th}$ columns in the template 401. Here, the above correspondence information may be stored and managed by the OSS 140, or alternatively acquired by the OSS 140 from outside and temporarily stored therein.

$3^{rd}$ Column in the template 401 is filled with the Japanese notation of the GC name, and $4^{th}$ column is filled with the English notation of the GC name. Furthermore, $6^{th}$ column in the template 401 is filled with regional information including, for example, the area (Western/Eastern Japan), the prefecture, the city or town, the address, the latitude, the longitude, and the like, where the GC is located.

$7^{th}$ Column in the template 401 is filled with information for calculating the IP address. For example, when an IPv6 address is used as the IP address, the information filled in $7^{th}$ column in the template 401 includes information for determining the prefix that constitutes the IPv6 address.

$8^{th}$ Column in the template 401 is filled with information on a destination central data center to which the GC is connected. The central data center information includes, for example, the name of the central data center, the IP address of the DNS server, and the like.

Yet furthermore, "Rack Information" of $9^{th}$ column in the template 401 is filled with the parameter information of $8^{th}$ and $9^{th}$ columns in the basic server information 402.

Likewise, "Server Information" of $10^{th}$ column in the template 401 is filled with the parameter information of $3^{rd}$ to $7^{th}$ columns in the basic server information 402.

In this way, it makes it possible to register the inventory information, which includes the basic server information 402 specified by the on-site operator 302 or read from the QR code and information derived from the basic server information 402, in the OSS 140.

When the inventory information is registered, the OSS 140 returns a return signal indicating that the inventory information registration is complete to the operation terminal 310. The on-site operator 302 is capable of confirming the completion of the registration of the inventory information by checking the return signal returned to the operation terminal 310.

Once the inventory information is registered in the OSS 140, it makes it possible to perform the inventory data generation processing based on the registered inventory information.

Figure 9:
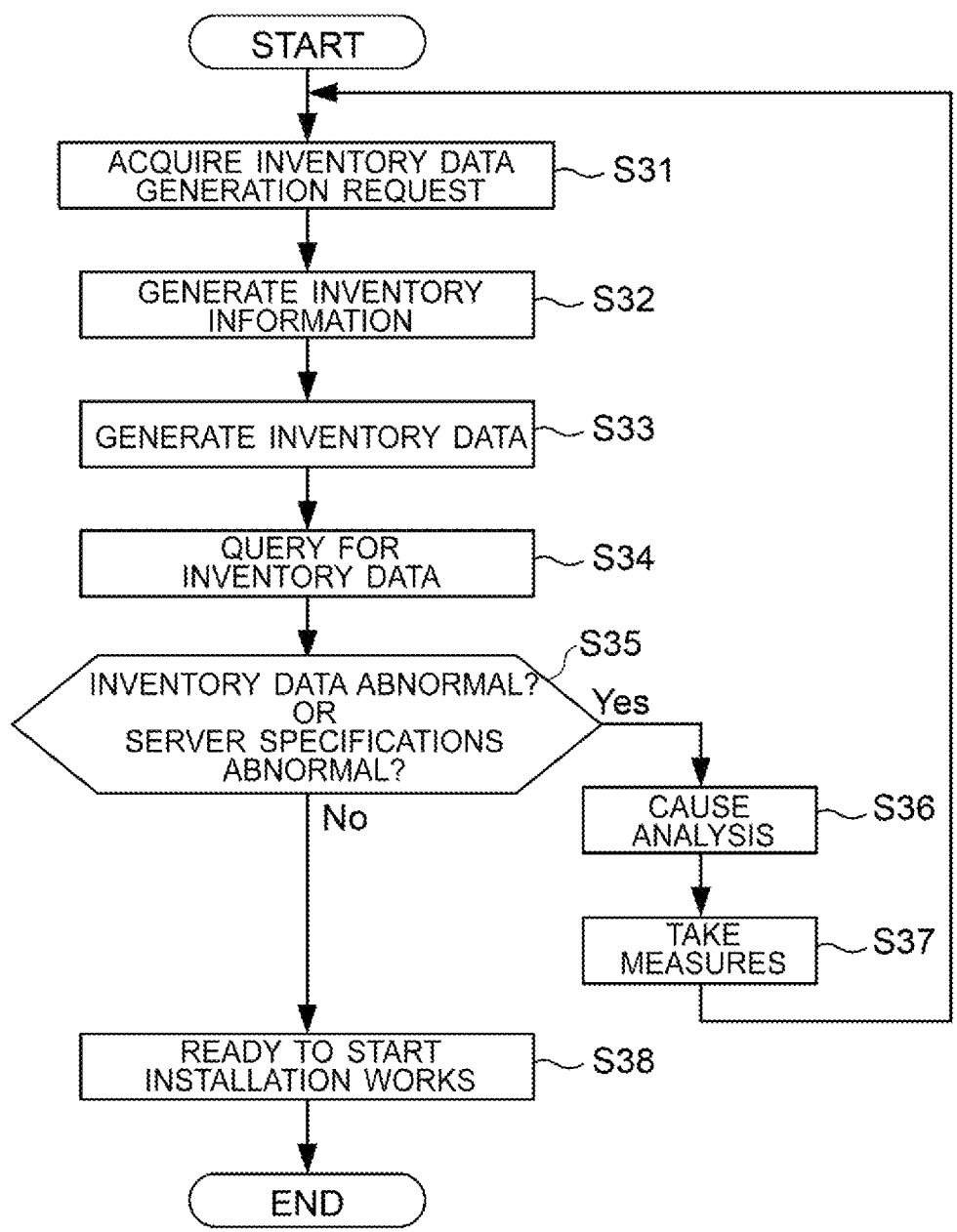
FIG. 9 is a flowchart illustrating an exemplary processing procedure of generation processing of inventory data.

FIG. 9 is a flowchart illustrating an exemplary processing procedure of the inventory data generation processing.

First, in step S31, the OSS 140 acquires an inventory data generation request sent from the administrator 300.

Next, in step S32, the OSS 140 generates other inventory information necessary for generating inventory data based on the inventory information registered during the processing shown in FIG. 4. Here, the generation processing of the inventory information in step S32 includes, for example, processing of generating the IP address from the MAC address.

In step S33, the OSS 140 generates the inventory data. More particularly, the OSS 140 adds the inventory information generated in step S32 to the inventory information registered during the processing in FIG. 4 and generates such inventory information as the inventory data.

In step S34, the OSS 140 queries the server about the normality (correctness) of the inventory data generated in step S33.

Figure 10:
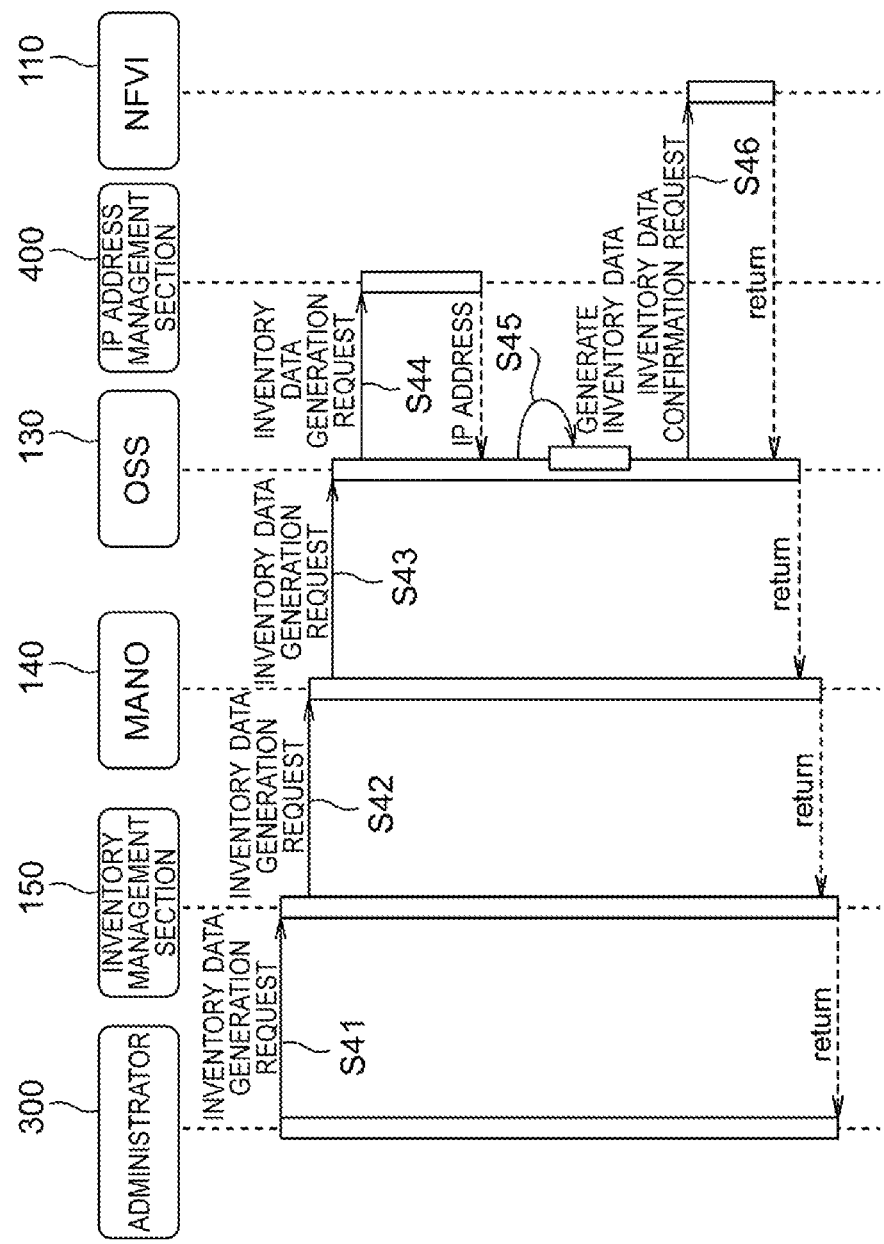
FIG. 10 is a sequence chart illustrating an exemplary operation of the inventory data generation.

FIG. 10 is a sequence diagram illustrating an exemplary operational sequence of inventory data generation and query operations.

First, in step S41, the administrator 300 sends a request for inventory data generation to the OSS 140. The inventory data generation request is sent from the inventory management section 150 to the OSS 140 via the MANO 130 (Steps S42 and S43). The inventory data generation request includes the GC ID or the GC code.

In step S44, the OSS 140 sends an IP address generation request to the IP address management section 400. More particularly, the OSS 140 reads the inventory information (i.e., the template 401 embedded with the basic server information 402) registered during the processing shown in FIG. 4 based on the GC ID or the GC code included in the inventory data generation request, includes the information necessary for calculating the IP address among the information included in the inventory information into the IP address generation request, and sends the IP address generation request to the IP address management section 400. Here, the information to be included in the IP address generation request includes the IP address information ($7^{th}$ column) and the MAC address included in the server information ($10^{th}$ column) in the above template 401.

The IP address management section 400 generates IP addresses based on the information received from the OSS 140 and sends the generated IP addresses to the OSS 140.

When the OSS 140 receives the IP address from the IP address management section 400, in step S45, the OSS 140 adds the IP address to the inventory information registered during the processing shown in FIG. 4 so as to generate the inventory data.

In other words, the inventory data is generated by embedding the basic server information 402 and the server-related information generated from the basic server information 402 into the template 401, which is provided for each GC. Here, the server-related information includes the inventory information derived from the basic server information 402 (e.g., "Regional Information" in FIG. 6) and the inventory information calculated from the basic server information 402 (e.g., IP address).

It should be noted that the server-related information is not limited to the above. For example, it is possible to generate the configuration file of the software running on the server based on the GC type included in the basic server information 402, and include the generated configuration file into the inventory data as the server-related information. In addition, other parameters necessary for configuration management of various installations can be included in the inventory data as the server-related information.

Referring back to FIG. 10, in step S46, the OSS 140 sends an inventory data confirmation request to the server to be queried, and queries the server about the normality of the inventory data generated in step S45. More particularly, the OSS 140 sends the server ID and the MAC address included in the inventory data to the NFVI 110, and confirms whether or not the server ID and the MAC address included in the inventory data coincide with a pair of the actual server ID and the MAC address.

At this time, when the pair of the server ID and the MAC address sent to the NFVI 110 and the pair of the server ID and the MAC address acquired from the NFVI 110, the OSS 140 may determine that the pair of (or correspondence between) the server ID and the MAC address is correct, in other words, the inventory data is normal.

The above inventory data normality check may be used to check for wiring errors of the servers. For example, assuming that an on-site operator 302 reverses the wiring between the server with ID=1 and the server with ID=2 during physical installation at the GC, when querying the server for its MAC address, the MAC address of the server with ID=2 is erroneously acquired as the MAC address of the server with ID=1. Therefore, it makes it possible to easily detect that the pair of the server ID and the MAC address in the inventory data is incorrect.

Furthermore, in this step S46, the OSS 140 may query for the specifications of the server to be queried and query the server about the normality of the inventory data generated in step S45.

In this case, the NFVI 110 returns the server specification information of the server to be queried to the OSS 140 based on the server ID and the MAC address received from the OSS 140. FIG. 11 is a schematic diagram illustrating an exemplary description of the server specification information sent from the NFVI 110 at this time.

As shown in FIG. 11, the NFVI 110 ties, as a key of the inventory data confirmation request, the BMC IP address ("BMC IP"), the serial number ("SERIAL NUMBER"), the power on/off status ("POWER STATUS"), the disk capacity ("DISK INFORMATION"), the memory capacity ("MEMORY INFORMATION"), the firmware version ("FIRMWARE VERSION"), and the fault detection signal ("FAULT LED CHECK") to the server ID and the MAC address received from the OSS 140, and sends to the OSS 140 as the server specification information 403.

Here, the parameter information of $4^{th}$ to $9^{th}$ columns in the server specification information 403 is information that may be acquired by accessing the server to be queried using the IP address of the BMC.

The specifications expected for each of servers are predetermined depending on the GC type. Therefore, the OSS 140 checks the server specifications acquired from the NFVI 110 against the desired server specifications, which are defined depending on the identification information (e.g., GC type) of the GC accommodating the server to be queried and the location information (e.g., rack information) of the server, and determines whether or not both of the server specifications coincide with each other. When the both coincide with each other, The OSSs 140 may determine that the server specifications are as expected, in other words, the inventory data is normal and the server specifications are also normal.

For example, when the memory is not physically inserted correctly, by checking the server specification information, it is determined that the memory capacity has not reached the desired capacity. Therefore, it makes it possible to detect the abnormality in the server specifications appropriately.

Referring back to FIG. 9, in step S35, the OSS 140 determines whether or not the inventory data abnormality or server specification abnormality has been detected as a result of the data inquiry in step S34. When the OSS 140 detects an abnormality in the inventory data or in the server specifications, the processing proceeds to step S36 to analyze the cause of the above-mentioned abnormality.

For example, when an abnormality in the inventory data is detected, it is possible to verify that the server is not wired incorrectly, that there was no problem in the inventory information reading or registration work by the on-site operator 302, or the like. Likewise, when an abnormality in the server specifications is detected, it is possible to verify that there is no component failure, connection error, or the like.

Subsequently, in step S37, depending on the analysis results in step S36, it is possible to take measures such as modification of wiring, replacement of components, replacement of the server, or the like, and the processing returns to step S31.

On the other hand, when the OSS 140 confirms in step S35 that the inventory data and the server specifications are normal, the processing proceeds to step S38 to determine that the server installation work is ready to start.

At this time, the OSS 140 may perform server provisioning. The start of the provisioning may be instructed to the OSS 140, for example, by the administrator 300 when the server installation work is ready to start.

Although in the above embodiment a certain case has been described in which the OSS 140 performs the processing of steps S31 to S35 shown in FIG. 9, alternatively the inventory management section 150 may perform the above described processing. In this case, the inventory information generation unit 152 of the inventory management section 150 may perform the processing of step S32, the inventory data generation unit 153 may perform the processing of step S33, and the inventory data query unit 154 may perform the processing of steps S34 and S35.

Furthermore, although in the above embodiment a certain case of the servers accommodated in the edge data centers (GCs) has been described, it is possible to register and manage the inventory data in the same way for servers accommodated in the central data center or the regional data centers.

For example, in the case of a server accommodated in the central data center, the inventory data may be registered and managed in a unit of POD. In this case, "GC" in the above description may be replaced with "POD". Likewise, in the case of a server accommodated in the regional data center, "GC" in the above explanation may be replaced with "RDC". It should be noted that, in this case, the template 401 for each GC shown in FIG. 6 is replaced with a template for each POD or RDC.

As described above, the inventory management section 150, which serves as the network management apparatus according to the present embodiment, acquires the basic server information 402, which includes the identification information of the accommodating station accommodating the servers, the server information including the MAC address of the BMC of the server, and location information indicating the installation position of the server in the accommodating station, and generates the server-related information including the IP address of the server based on the acquired basic server information 402. Subsequently, based on the acquired basic server information 402 and the server-related information including the generated IP address, the inventory management section 150 generates the setting information (i.e., inventory data) necessary for provisioning the servers and queries the server about the normality of the generated inventory data.

Telecom networks are large-scale, and there are a large number of servers constituting the network and a large number of accommodating stations accommodating those servers as well. Manually registering the inventory data required for provisioning each of those servers is therefore a considerably time-consuming task and may cause human errors.

According to the present embodiment, the inventory management section 150 generates the inventory data required for server provisioning based on the basic server information 402, and queries the server about the normality of the generated inventory data. As a result, it makes it possible to register and manage the inventory data more easily with higher accuracy.

Here, the server information may be the information read from the server by the on-site operator 302 who actually installed the server at the accommodating station. The location information of the server may be the information on the installation location of the server specified by the on-site operator 302. The basic server information 402 may be the data in which the server information is tied to the identification information of the accommodating station and the location information of the server by the on-site operator 302.

The on-site operator 302 is the person who conducts the physical installation of the server and thus who is capable of guaranteeing which server is installed in which housing station and at which location. Therefore, as described above, by tying the server information read from the server by the on-site operator 302 to the identification information of the accommodating station and the location information of the server specified by the on-site operator 302, it makes it possible to acquire the appropriate basic server information 402.

Furthermore, unique server information such as the MAC address, the server ID, the server code, the host name, and the serial number is embedded in the QR code and assigned to the server, and the on-site operator 302 reads the server information from the QR code. For this reason, it eliminates a need for a person to manually input or manage the server information. Therefore, it makes it possible to appropriately suppress the human errors, which are caused by human intervention in registration and management, from occurring. As a result, it makes it possible to reduce the time and manpower required to deal with errors.

Yet furthermore, when generating the inventory data, the inventory data may be generated by generating the template 401 of the inventory data for each of the accommodating stations and embedding the basic server information 402 and the server-related information generated from the basic server information 402 into the generated template 401.

In this way, by using inventory data templates, it makes it possible to generate the inventory data easily and appropriately by simply acquiring the minimum information required to generate the inventory data.

Yet furthermore, by querying the server for its MAC address after generating the inventory data based on the basic server information 402, it makes it possible to confirm the normality of the inventory data. Therefore, in the case in which, for example, the on-site operator 402 has wired the server incorrectly, it makes it possible to detect and deal with the problem appropriately.

Once the physical installation is completed and the server is connected to the network, it is possible to access the server to acquire the serial number and hardware information of the server concerned via the network. Therefore, it is conceivable to realize automatic provisioning, where the processing of acquiring the server information, generating the inventory data, and executing provisioning is done fully automatically. However, in this case, the server information of the server concerned is acquired remotely, assuming that the server is installed at a certain location in a certain rack of a certain accommodating station. For this reason, once the server is wired incorrectly, provisioning will be erroneously executed without noticing the mistake.

In contrast, the present embodiment is capable of properly detecting and dealing with wiring errors as described above, thus it makes it possible to avoid the abnormalities in the inventory data and the occurrence of secondary errors caused by them.

In addition, the present embodiment is capable of querying the server specifications to check whether or not the queried server specifications coincide with the server specifications originally expected for the server concerned. This allows the inventory management section 150 to appropriately detect and deal with cases in which, for example, the memory is not properly inserted, even when there is no mistake in the wiring of the server.

As described above, according to the present embodiment, it makes it possible to register the setting information (i.e., inventory data) necessary for provisioning the devices constituting a large-scale network more easily with higher accuracy.

The network management apparatus according to the present embodiment may be implemented in any of general-purpose servers that constitute the backhaul network, the core network, or the like, of the mobile network 100. Alternatively, the network management apparatus may be implemented in a dedicated server. The network management apparatus may also be implemented on a single or a plurality of computers.

When the network management apparatus is implemented on a single computer, the network management apparatus may include a CPU, a ROM, a RAM, an HDD, an input unit (e.g., keyboard, pointing device, or the like), a display unit (e.g., monitor, or the like), a communication I/F, and the like. In this case, at least a part of the functions of the constituent elements of the inventory management section 150 shown in FIG. 3 may be performed by executing the program by the above CPU. However, at least a part of the constituent elements of the inventory management section 150 shown in FIG. 3 may be operated as dedicated hardware. In this case, the dedicated hardware operates based on the control of the above CPU.

Although certain embodiments have been described above, the embodiments described are merely illustrative and are not intended to limit the scope of the present invention. The apparatus and methods described herein may be embodied in other forms than those described above. In addition, without departing from the scope of the present invention, omissions, substitutions, and modifications may be made to the above embodiments as appropriate. Such omissions, substitutions, and modifications fall within the scope of the appended claims and equivalents thereof, and fall within the technical scope of the present invention.

REFERENCE SIGNS LIST

11: Base Station; 12: Edge Data Center; 13: Regional Data Center; 14: Central Data Center; 100: Mobile Network; 110: NFVI; 120: VNF; 130: MANO; 131: NFVO; 132: VNFM; 133: VIM; 140: OSS/BSS; 150: Inventory Management Section; 151: Inventory Information Acquisition unit; 152: Inventory Information Generation Unit; 153: Inventory Data Generation Unit; 154: Inventory Data Inquiry Unit; 401: Template of Inventory Data; 402: Basic Server Information; 403: Server Specification Information

What is claimed is:

1. A network management apparatus, comprising:
at least one memory configured to store program code; and
electric circuitry including at least one of a field programmable gate array (FPGA), an application specific integrated circuit (ASIC), and at least one processor, the at least one processor being configured to read and operate according to the program code, the electronic circuitry configured to:
  acquire basic server information including server information and location information, the server information including identification information of an accommodating station accommodating a server that constitutes a network and an identifier of a Baseboard Management Controller (BMC) of the server, the location information indicating an installation location of the server in the accommodating station;
  generate server-related information including at least an IP address of the server based on the identifier of the BMC;
  generate setting information for provisioning the server based on the basic server information and the server-related information;
  query the server about an accuracy of the setting information with respect to predetermined setting information; and
  determine, based on a response to the query, that the setting information is accurate, wherein the setting information being accurate includes at least one hardware specification of the server coincides with a predetermined specification of the server; and cause the server to be provisioned in accordance with the setting information based on determining that the setting information is accurate.

2. The network management apparatus according to claim 1, wherein
  the identifier of the BMC is a MAC address of the BMC.

3. The network management apparatus according to claim 1, wherein
  acquiring the basic information acquires the server information that is read from an image code assigned to the server by an operator who has installed the server in the accommodating station.

4. The network management apparatus according to claim 1, wherein
  the server information includes the identifier of the BMC, and at least one of a server ID, a server code, a host name, and a serial number.

5. The network management apparatus according to claim 1, wherein
  acquiring the basic information acquires the location information specified by an operator who has installed the server in the accommodating station.

6. The network management apparatus according to claim 1, wherein
  the location information includes at least one of a rack name and a rack number of a rack in which the server is installed.

7. The network management apparatus according to claim 1, the electric circuitry further configured to:
  generate a template of the setting information for each of the accommodating stations; and wherein
  generating the setting information generates the setting information by embedding the basic server information and the server-related information into the template based on the identification information of the accommodating station.

8. The network management apparatus according to claim 1, wherein
  the identifier of the BMC is a MAC address of the BMC, and
  querying for the MAC address of the server to be queried, and, when the queried MAC address coincides with the MAC address corresponding to the server to be queried included in the setting information, determines the setting information to be normal.

9. The network management apparatus according to claim 1, wherein
  querying for server specifications of the server to be queried, and, when the queried server specifications coincide with a desired server specifications depending on the identification information of the accommodating station and the location information that correspond to the server to be queried included in the setting information, determines the setting information to be normal.

10. The network management apparatus according to claim 1, the electric circuitry further configured to:
  execute provisioning of the server using the setting information when the accuracy of the setting information is confirmed.

11. The network management apparatus according to claim 1, wherein
  acquiring the basic information acquires the basic server information of the server on which a virtual machine operates.

12. A network management method performed by a network management apparatus, comprising steps of:
  acquiring basic server information including server information and location information, the server information including identification information of an accommodating station accommodating a server that constitutes a network and an identifier of a Baseboard Management Controller (BMC) of the server, the location information indicating an installation location of the server in the accommodating station;
  generating server-related information including at least an IP address of the server based on the identifier of the BMC;
  generating setting information necessary for provisioning the server based on the basic server information and the server-related information;
  querying the server about accuracy of the setting information with respect to predetermined setting information, and
  determining, based on a response to the query, that the setting information is accurate, wherein the setting information being accurate includes at least one hardware specification of the server coincides with a predetermined specification of the server; and cause the server to be provisioned in accordance with the setting information based on determining that the setting information is accurate.

13. A non-transitory computer readable medium having instructions stored therein, which when executed by a processor cause the processor to execute network management processing comprising:
  a basic information acquisition process for acquiring basic server information including server information and location information, the server information including identification information of an accommodating station accommodating a server that constitutes a network and an identifier of a Baseboard Management Controller (BMC) of the server, the location information indicating an installation location of the server in the accommodating station;
  a related information generation process for generating server-related information including at least an IP address of the server based on the identifier of the BMC acquired by the basic information acquisition process;

a setting information generation process for generating setting information necessary for provisioning the server based on the basic server information acquired by the basic information acquisition process and the server-related information generated by the related information generation process;

a data query process for querying the server about an accuracy of the setting information generated by the setting information generation process with respect to predetermined setting information, and a determining process, that determines, based on a response to the query, that the setting information is accurate, wherein the setting information being accurate includes at least one hardware specification of the server coincides with a predetermined specification of the server; and cause the server to be provisioned in accordance with the setting information based on determining that the setting information is accurate.

* * * * *